(12) United States Patent
Liu et al.

(10) Patent No.: US 9,753,547 B2
(45) Date of Patent: Sep. 5, 2017

(54) INTERACTIVE DISPLAYING METHOD, CONTROL METHOD AND SYSTEM FOR ACHIEVING DISPLAYING OF A HOLOGRAPHIC IMAGE

(71) Applicant: SHENZHEN ESTAR TECHNOLOGY GROUP CO., LTD., Shenzhen, Guangdong Province (CN)

(72) Inventors: Meihong Liu, Shenzhen (CN); Yihua Chen, Shenzhen (CN)

(73) Assignee: SHENZHEN ESTAR TECHNOLOGY GROUP CO., LTD., Shenzhen, Guangdong Province (CN)

( * ) Notice: Subject to any disclaimer, the term of this patent is extended or adjusted under 35 U.S.C. 154(b) by 174 days.

(21) Appl. No.: 14/596,215

(22) Filed: Jan. 13, 2015

(65) Prior Publication Data

US 2016/0091979 A1  Mar. 31, 2016

(30) Foreign Application Priority Data

Sep. 30, 2014 (CN) .......................... 2014 1 0527699

(51) Int. Cl.
| | |
|---|---|
| *G06F 3/01* | (2006.01) |
| *G03H 1/00* | (2006.01) |
| *H04N 13/02* | (2006.01) |
| *G06F 3/042* | (2006.01) |
| *G06F 3/043* | (2006.01) |

(52) U.S. Cl.
CPC ........... *G06F 3/017* (2013.01); *G03H 1/0005* (2013.01); *H04N 13/0253* (2013.01); *G03H 2001/0061* (2013.01); *G06F 3/011* (2013.01); *G06F 3/043* (2013.01); *G06F 3/0421* (2013.01); *G06F 2203/04108* (2013.01)

(58) Field of Classification Search
CPC ............................... G06F 3/017; G06F 3/0421
See application file for complete search history.

(56) References Cited

U.S. PATENT DOCUMENTS

| | | | | |
|---|---|---|---|---|
| 6,097,374 | A * | 8/2000 | Howard | G06F 3/011 345/157 |
| 2002/0070921 | A1* | 6/2002 | Feldman | G06F 3/0202 345/168 |
| 2009/0076766 | A1* | 3/2009 | Fein | G06F 3/0304 702/150 |

(Continued)

*Primary Examiner* — Claire X Pappas
*Assistant Examiner* — Robert Stone
(74) *Attorney, Agent, or Firm* — Cheng-Ju Chiang

(57) ABSTRACT

An interactive displaying method, a control method and an apparatus for achieving displaying of a holographic image are provided. The interactive displaying method comprises: scanning a 3D space by controlling signal transmitters arranged in a matrix to transmit signals; determining a target object in the 3D space; and determining a first position of the target object and displaying a viewable image corresponding to the target object at a second position of a display region. The control method comprises: scanning a 3D space by controlling signal transmitters arranged in a matrix to transmit signals; determining a gesture operation of a target object; determining the gesture; and executing a control operation corresponding to the gesture. The apparatus comprises a display unit, a signal detecting unit, a position determining unit and a display control unit.

8 Claims, 15 Drawing Sheets

(56) References Cited

U.S. PATENT DOCUMENTS

| | | | | |
|---|---|---|---|---|
| 2009/0102603 A1* | 4/2009 | Fein | ................... | G03H 1/0005 340/5.81 |
| 2009/0109215 A1* | 4/2009 | Fein | ...................... | G06F 3/011 345/419 |
| 2009/0233714 A1* | 9/2009 | Toro | ...................... | A63F 13/06 463/39 |
| 2011/0279397 A1* | 11/2011 | Rimon | ................... | G06F 3/044 345/173 |
| 2012/0299820 A1* | 11/2012 | Dahl | ...................... | G06F 3/011 345/156 |
| 2014/0306891 A1* | 10/2014 | Latta | ...................... | G06F 3/017 345/158 |
| 2014/0364218 A1* | 12/2014 | Holmgren | ............... | G01S 17/48 463/31 |
| 2015/0258432 A1* | 9/2015 | Stafford | ............... | A63F 13/213 463/32 |

* cited by examiner

INTERACTIVE DISPLAYING METHOD, CONTROL METHOD AND SYSTEM FOR ACHIEVING DISPLAYING OF A HOLOGRAPHIC IMAGE

FIELD OF THE INVENTION

The present disclosure generally relates to the technical field of user interaction applications, and more particularly, to an interactive displaying method, a control method and a system for achieving displaying of a holographic image.

BACKGROUND OF THE INVENTION

The user interface (UI) design refers to an overall design of the human-machine interface (HMI), operation logics and interface aesthetics of software. During the process of a user interacting with a machine to obtain information and experiences, there needs a medium, that is, a viewable HMI as well as an interactive device and a method corresponding to the HMI. For example, the advent of touch-screen mobile phones presents the touch interaction mechanism to the general public consumers. Meanwhile, the conventional interfaces such as mice and keyboards have been rapidly evolved into interfaces that are adapted to the touch interactions. Now, the users can interact with a host by clicking on the touch screen or dragging an icon displayed on the screen.

However, in the prior art touch screens regardless of capacitive touch screens or resistive touch screens, a piece of touch glass or thin film needs to be additionally disposed in front of the liquid crystal display (LCD) panel, and this adds to the thickness and weight of the display screen. Meanwhile, when the consumer touches the display screen of an electronic apparatus with a finger to control the electronic apparatus, swings of the apparatus itself tend to be caused and there exist a certain distance and a certain angle between the display screen and the consumer. Additionally, touching the display screen directly with the finger tends to cause a residual fingerprint on the display screen. Further, for planar interfaces that are manipulated through touching, the richness of contents in the interfaces is greatly restricted. Specifically, the operation of making a confirmation or selection by moving a cursor to a certain button and staying there for a period of time allows for only one kind of confirmation or entry, so the interaction richness is restricted and, additionally, this makes the user feel unnatural and restrained during the interaction operations.

Nowadays, holographic display technologies have been developed. The term "holographic" may be understood as displaying objects or frames in a 3D form (i.e., presenting all frames at all view angles of an object). The holographic imaging technologies comprise recording and reproducing images of all frames at all view angles of an object by means of a special technical means so that a visual effect totally the same as the real-world scene is perceived by human eyes. Accordingly, providing a mechanism of interaction that utilizes (holographic) 3D images separate from screen touch operations will greatly improve operation experiences of the users.

SUMMARY OF THE INVENTION

A main technical problem to be solved by the present disclosure is to provide an interactive displaying method, a control method and an apparatus for achieving displaying of a holographic image, which can provide holographic images corresponding to gestures made by a user in a 3D space in front of a display screen, thus achieving 3D interaction operations.

To solve the aforesaid technical problem, a technical solution adopted in the present disclosure is to provide an interactive displaying method for achieving displaying of a holographic image, which comprises the following steps of: scanning a 3D space by controlling signal transmitters arranged in a matrix to transmit signals; and determining a target object in the 3D space according to a signal received by any of the signal receivers arranged in a matrix from a corresponding one of the signal transmitters; wherein each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object; and determining a position S, in the matrix, of the one of the signal receivers arranged in the matrix that receives the signal transmitted by the corresponding signal transmitter, and determining a distance L between the determined signal receiver and the target object; determining a first position of the target object according to the position S and the distance L; and displaying a viewable image corresponding to the target object at a second position of a display region, wherein the second position has a mapping relationship with the first position.

Further, the signals transmitted by the signal transmitters are laser signals, infrared signals or ultrasonic signals.

Further, the step of determining a target object in the 3D space according to a signal received by any of the signal receivers arranged in a matrix from a corresponding one of the signal transmitters comprises: detecting whether any of the signal receivers arranged in the matrix receives a signal; and if there is any of the signal receivers that has received a signal, then determining whether label information carried in the received signal matches label information of the signal receiver, wherein the label information carried by the signal is carried when the signal is transmitted by the signal transmitter, and the label information matches the label information of the signal receiver corresponding to the signal transmitter; and if the label information carried by the received signal matches the label information of the signal receiver, then determining that the target object is located in the 3D space.

Further, the step of determining a first position of the target object according to the position S and the distance L is specifically as follows: determining coordinates of the target object on an X axis and a Y axis according to the position S, and determining a coordinate of the target object on a Z axis according to the distance L.

Further, the interactive displaying method for achieving displaying of a holographic image further comprises the following steps after the step of determining a first position of the target object according to the position S and the distance L: determining a corresponding gesture according to the position and a motion trajectory of the target object, wherein the motion trajectory is determined according to a plurality of positions of the target object within a predetermined time; and executing a control operation corresponding to the gesture.

Further, the interactive displaying method for achieving displaying of a holographic image further comprises the following step after the step of determining a corresponding gesture according to the position and a motion trajectory of the target object: displaying a gesture icon at a position in the display region that corresponds to the position of the gesture in the 3D space.

Further, the interactive displaying method for achieving displaying of a holographic image further comprises the following steps after the step of determining a corresponding gesture according to the position and a motion trajectory of the target object: displaying an object in one or more display sub-regions of the display region, and defining a sensing region for sensing the gesture in each of the display sub-regions; and determining whether a gesture region corresponding to the gesture in the display region is in the sensing region so as to determine whether to control the object displayed in the display region according to the gesture.

Further, the step of displaying a viewable image corresponding to the target object at a second position of a display region is specifically as follows: displaying a holographic image corresponding to the target object at the second position of the display region.

To solve the aforesaid technical problem, another technical solution adopted by the present disclosure is to provide an interactive control method for achieving displaying of a holographic image, which comprises the following steps of: scanning a 3D space by controlling signal transmitters arranged in a matrix to transmit signals; determining an operational gesture in the 3D space according to a signal received by any of the signal receivers arranged in a matrix from a corresponding one of the signal transmitters, wherein each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the hand; determining a position S, in the matrix, of the one of the signal receivers arranged in the matrix that receives the signal transmitted by the corresponding signal transmitter, and determining a distance L between the determined signal receiver and the hand; determining the gesture according to the position S and the distance L; and executing a control operation corresponding to the gesture.

To solve the aforesaid technical problem, still another technical solution adopted by the present disclosure is to provide an interactive displaying apparatus for achieving displaying of a holographic image. The interactive displaying apparatus comprises: a signal detecting unit, being formed by a plurality of pairs of signal transmitters and signal receivers arranged in matrices, being configured to scan a 3D space by controlling the signal transmitters to transmit signals and to determine a target object in the 3D space according to a signal received by any of the signal receivers from a corresponding one of the signal transmitters, wherein each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object; a position determining unit, being configured to determine a position S, in the matrix, of the one of the signal receivers arranged in the matrix that receives the signal transmitted by the corresponding signal transmitter, and determine a distance L between the determined signal receiver and the target object; and is further configured to determine a first position of the target object according to the position S and the distance L; and a display control unit, being configured to control the display unit to display a viewable image corresponding to the target object at a second position of a display region according to the first position of the target object determined by the position determining unit, wherein the second position has a mapping relationship with the first position.

The present disclosure has the following benefits: as compared to the prior art, the present disclosure can achieve 3D interaction operations according to gesture operations made by the user in the 3D space in front of the display screen. Because the operations are performed in the 3D space in front of the screen without touching the display screen, no swing of the apparatus itself will be caused and, meanwhile, residual fingerprints on the display screen can be avoided. Furthermore, during the interaction operations, operations such as moving and depressing can all be performed in a 3D space instead of being restricted only in a single plane, which can present a natural feeling to the user and improve the richness of interactions.

BRIEF DESCRIPTION OF THE DRAWINGS

FIG. 1-2 is a schematic view illustrating principles of the interactive displaying for achieving displaying of a holographic image according to the first embodiment of the present disclosure;

FIG. 1-3 is a schematic view illustrating principles of determining the position of a target object in the interactive displaying method for achieving displaying of a holographic image according to the first embodiment of the present disclosure;

FIG. 2-1 is a schematic flowchart diagram of an interactive displaying method for achieving displaying of a holographic image according to a second embodiment of the present disclosure;

FIG. 2-2 is a schematic flowchart diagram of determining a target object in a 3D space according to the second embodiment of the present disclosure;

FIG. 3-1 is a schematic flowchart diagram of an interactive displaying method for achieving displaying of a holographic image according to a third embodiment of the present disclosure;

FIG. 3-2 is a schematic view illustrating principles of the interactive displaying for achieving displaying of a holographic image according to the third embodiment of the present disclosure;

FIG. 4-1 is a schematic flowchart diagram of an interactive displaying method for achieving displaying of a holographic image according to a fourth embodiment of the present disclosure;

FIG. 4-2 is a schematic view illustrating a depressing state in the interactive displaying method for achieving displaying of a holographic image according to the fourth embodiment of the present disclosure;

FIG. 4-3 is a schematic view illustrating a pulling-down state in the interactive displaying method for achieving displaying of a holographic image according to the fourth embodiment of the present disclosure;

FIG. 5-1 is a schematic flowchart diagram of an interactive displaying method for achieving displaying of a holographic image according to a fifth embodiment of the present disclosure;

FIG. 5-2 is a schematic view illustrating a state before depressing in the interactive displaying method for achieving displaying of a holographic image according to the fifth embodiment of the present disclosure;

FIG. 5-3 is a schematic view illustrating a state after depressing in the interactive displaying method for achieving displaying of a holographic image according to the fifth embodiment of the present disclosure;

FIG. 6-1 is a schematic flowchart diagram of an interactive displaying method for achieving displaying of a holographic image according to a sixth embodiment of the present disclosure;

FIG. 6-2 is a schematic view illustrating a state when a finger is in a sensing region in the interactive displaying method for achieving displaying of a holographic image according to the sixth embodiment of the present disclosure;

FIG. 6-3 is a schematic view illustrating a state when the finger is not in the sensing region in the interactive displaying method for achieving displaying of a holographic image according to the sixth embodiment of the present disclosure;

11: Signal transmitter; 12: Signal receiver; 13: 3D space; 14: Finger; 15: Display region; 16: Viewable image; 61: Button I; 62: Button II; 63: Button III; 80: Interactive display apparatus; 81: Signal detecting unit; 82: Position determining unit; 83: Display control unit; 84: Display unit.

DETAILED DESCRIPTION OF THE INVENTION

The present disclosure will be detailed with reference to the attached drawings and embodiments thereof in order to detail the technical contents, the structural features, as well as the objectives and the effects to be achieved of the present disclosure.

Figure 1:
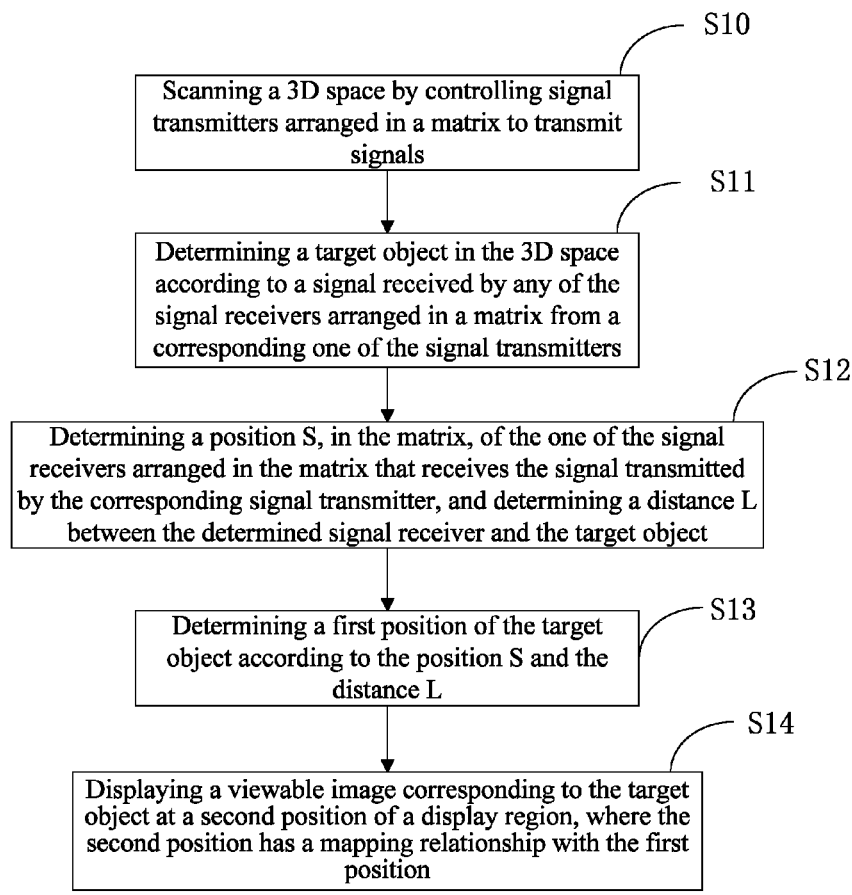
FIG. 1-1 is a schematic flowchart diagram of an interactive displaying method for achieving displaying of a holographic image according to a first embodiment of the present disclosure.

Referring to FIG. 1-1, there is shown a schematic flowchart diagram of an interactive displaying method for achieving displaying of a holographic image according to a first embodiment of the present disclosure. The process flow of the interactive displaying method shown in this embodiment comprises the following steps of:

S10, scanning a 3D space by controlling signal transmitters arranged in a matrix to transmit signals.

S11, determining a target object in the 3D space according to a signal received by any of the signal receivers arranged in a matrix from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object.

S12, determining a position S, in the matrix, of the one of the signal receivers arranged in the matrix that receives the signal transmitted by the corresponding signal transmitter, and determining a distance L between the determined signal receiver and the target object.

S13, determining a first position of the target object according to the position S and the distance L.

S14, displaying a viewable image corresponding to the target object at a second position of a display region, where the second position has a mapping relationship with the first position.

Figures 1, 2:
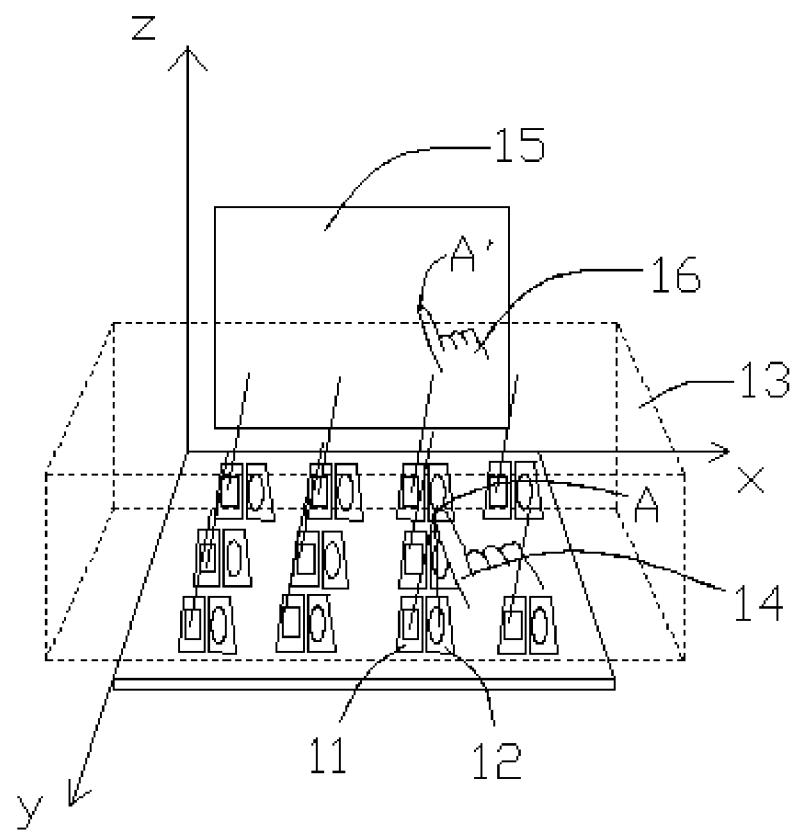
Figures 1, 2, 3:
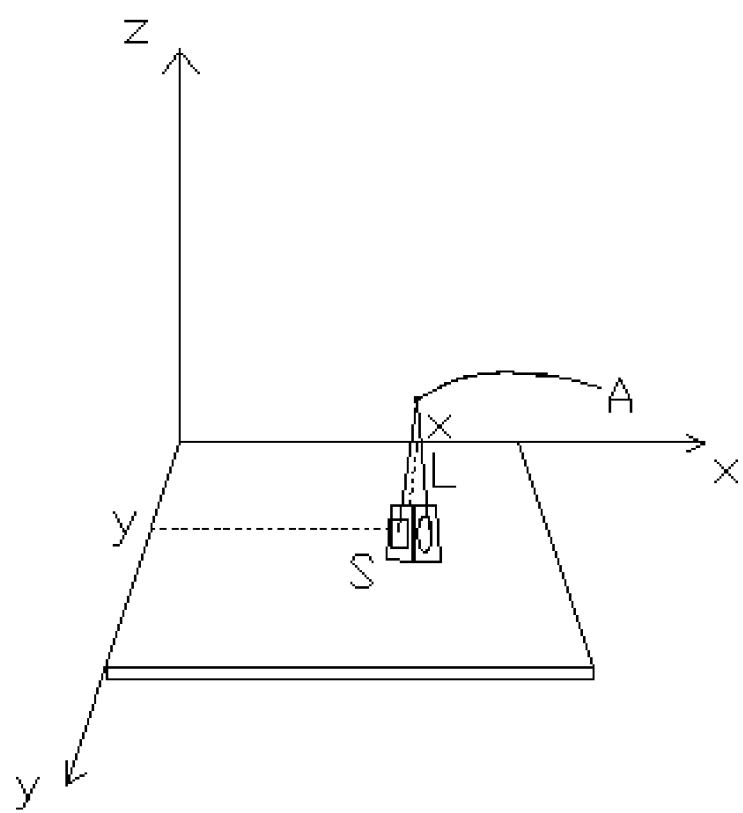
Figures 1, 2:
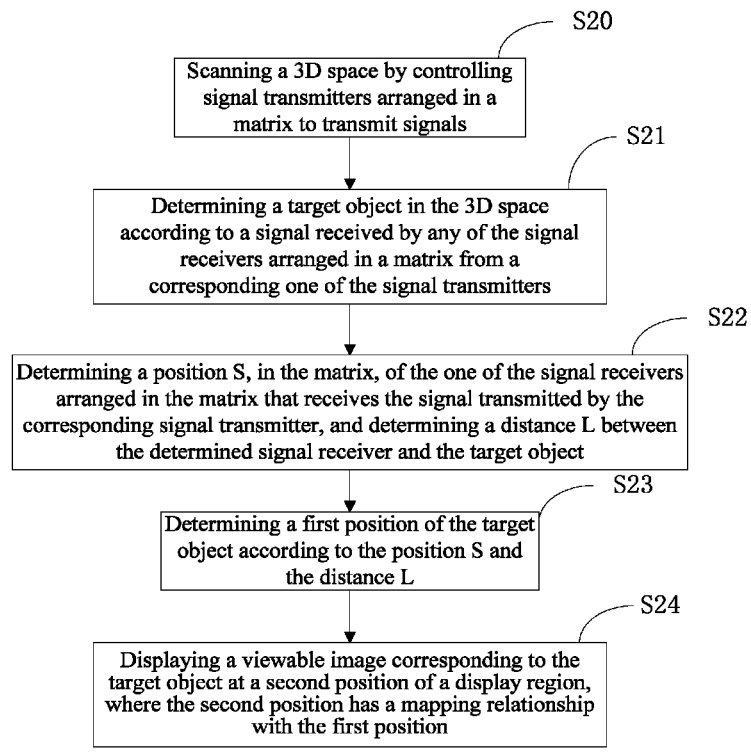
Figure 2:
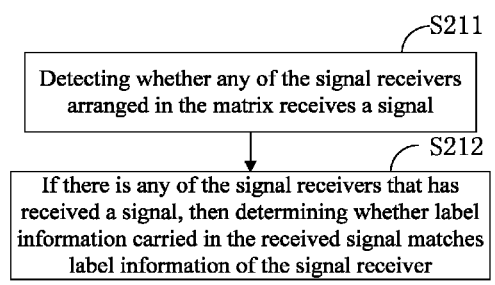
Figures 1, 3:
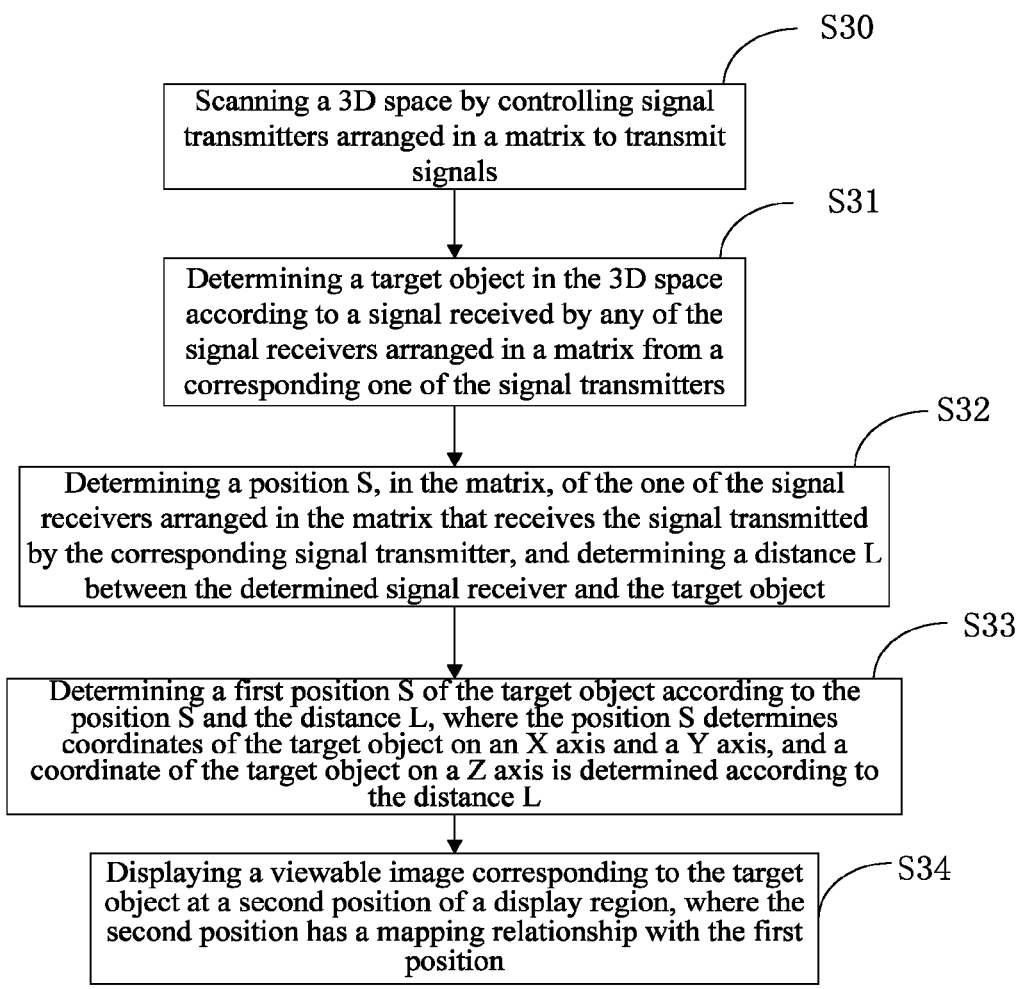
Figures 2, 3:
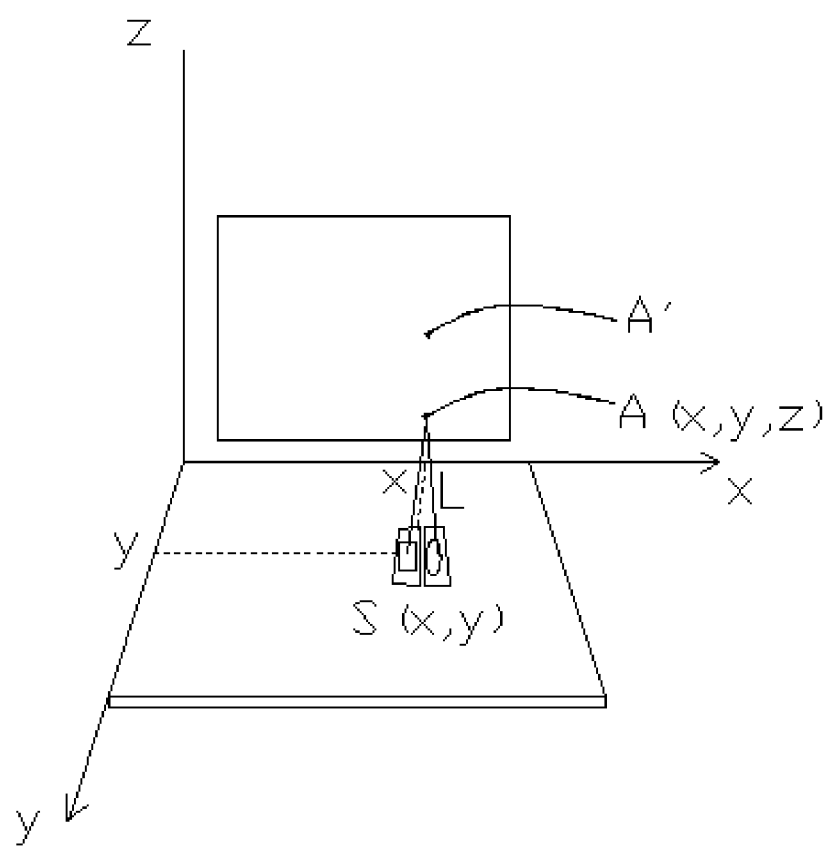

As shown in FIG. 1-2 and FIG. 1-3, signal transmitters 11 scan a 3D space 13; and after a finger 14 enters the 3D space 13, a signal transmitted by one of the signal transmitters 11 is reflected by the finger 14 when encountering the finger 14 and then is received by a corresponding signal receiver 12. For a point (e.g., a point A) on the finger 14, a signal of a signal transmitter A that is reflected is received by a corresponding signal receiver A so that the detecting of the finger 14 can be determined. The first position of the point A can be determined according to the position S, in the matrix, of the signal receiver A that has received the reflected signal and the distance L between the signal receiver and the point A. The point is mapped onto a display region 15 as a corresponding point A' located at a second position. The positions of a plurality of other points on the finger 14 can be determined in the same way so that the position of the finger 14 can be determined. The finger 14 is mapped onto the display region 15 as a corresponding viewable image 16 at the second position. The viewable image 16 may be an arrow, a hand-shaped icon or the like and, in this embodiment, is a finger. The image is mapped onto the display region along a Y axis from the space position of the finger.

Further, the viewable image corresponding to the target object and displayed at the second position of the display region may be a holographic image corresponding to the target object.

Referring to FIG. 2-1, there is shown a schematic flowchart diagram of an interactive displaying method for achieving displaying of a holographic image according to a second embodiment of the present disclosure. The process flow of the interactive displaying method shown in this embodiment comprises the following steps of:

S20, scanning a 3D space by controlling signal transmitters arranged in a matrix to transmit signals.

S21, determining a target object in the 3D space according to a signal received by any of the signal receivers arranged in a matrix from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object.

Referring also to FIG. 2-2, the step of determining a target object in the 3D space according to a signal received by any of the signal receivers arranged in a matrix from a corresponding one of the signal transmitters comprises:

S211, detecting whether any of the signal receivers arranged in the matrix receives a signal.

S212, if there is any of the signal receivers that has received a signal, then determining whether label information carried in the received signal matches label information of the signal receiver.

The label information carried by the signal is carried when the signal is transmitted by the signal transmitter, and the label information matches the label information of the signal receiver corresponding to the signal transmitter.

If the label information carried by the received signal matches the label information of the signal receiver, then determining that the target object is located in the 3D space.

S22, determining a position S, in the matrix, of the one of the signal receivers arranged in the matrix that receives the signal transmitted by the corresponding signal transmitter, and determining a distance L between the determined signal receiver and the target object.

S23, determining a first position of the target object according to the position S and the distance L.

S24, displaying a viewable image corresponding to the target object at a second position of a display region, where the second position has a mapping relationship with the first position.

In this embodiment, whether any of the signal receivers receives a signal is detected at the same time when the 3D space is scanned by the signal transmitters. After the finger enters the 3D space, a signal transmitted by one of the signal transmitters is reflected by the finger when encountering the finger and then is received by a corresponding signal receiver. Referring back to FIG. 1-3, after the signal of the signal transmitter A is reflected by a point (e.g., the point A) on the finger, it can be detected that the signal is received by the corresponding signal receiver A.

In this embodiment, the signal transmitted by the signal transmitter A carries label information that matches the label information of the signal receiver. After the signal is received by the signal receiver A, whether the signal matches the label information of the signal receiver A is determined. If the label information carried by the signal matches the label information of the signal receiver A, then it is determined that the finger is located in the 3D space.

If it is detected that the signal is not received by any of the signal receivers, then it is determined that there is no target object in the 3D space.

A first position of the point A can be determined according to the position S, in the matrix, of the signal receiver A that has received the reflected signal and the distance L between the signal receiver and the point A. The positions of a plurality of other points on the finger can be determined in the same way so that the position of the finger can be determined. The finger is mapped onto the display region 15 as the corresponding viewable image 16 located at the second position, as shown in FIG. 1-2.

Referring to FIG. 3-1, there is shown a schematic flowchart diagram of an interactive displaying method for achieving displaying of a holographic image according to a third embodiment of the present disclosure. The process flow of the interactive displaying method shown in this embodiment comprises the following steps of:

S30, scanning a 3D space by controlling signal transmitters arranged in a matrix to transmit signals.

S31, determining a target object in the 3D space according to a signal received by any of the signal receivers arranged in a matrix from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object.

S32, determining a position S, in the matrix, of the one of the signal receivers arranged in the matrix that receives the signal transmitted by the corresponding signal transmitter, and determining a distance L between the determined signal receiver and the target object.

S33, determining a first position of the target object according to the position S and the distance L. Coordinates of the target object on an X axis and a Y axis are determined by the position S, and a coordinate of the target object on a Z axis is determined according to the distance L.

S34, displaying a viewable image corresponding to the target object at a second position of a display region, where the second position has a mapping relationship with the first position.

In this embodiment, whether any of the signal receivers receives a signal is detected at the same time when the 3D space is scanned by the signal transmitters. After the finger enters the 3D space, a signal transmitted by one of the signal transmitters is reflected by the finger when encountering the finger and is then received by a corresponding signal receiver. As shown in FIG. 3-2, after the signal of the signal transmitter A is reflected by a point (e.g., the point A) on the finger, it can be detected that the signal is received by the corresponding signal receiver A. The position S (x, y), in the matrix, of the signal receiver A that receives the reflected signal is just the position of the finger in a plane defined by the X axis and the Y axis. Because the signal receiver A is disposed corresponding to the signal transmitter A and at a position in the matrix that is identical or adjacent to that of the signal transmitter A, it can be believed that the distance L between the signal receiver A and the finger is approximately equal to the distance (i.e., a coordinate z of the point A on the Z axis) from the point A to the plane defined by the X axis and the Y axis. Therefore, the first position A (x, y, z) of the point A can be determined, and meanwhile, the viewable image of the finger is displayed at the second position of the display region. In this embodiment, the viewable image is the finger. The second position has a mapping relationship with the first position.

Figures 1, 4:
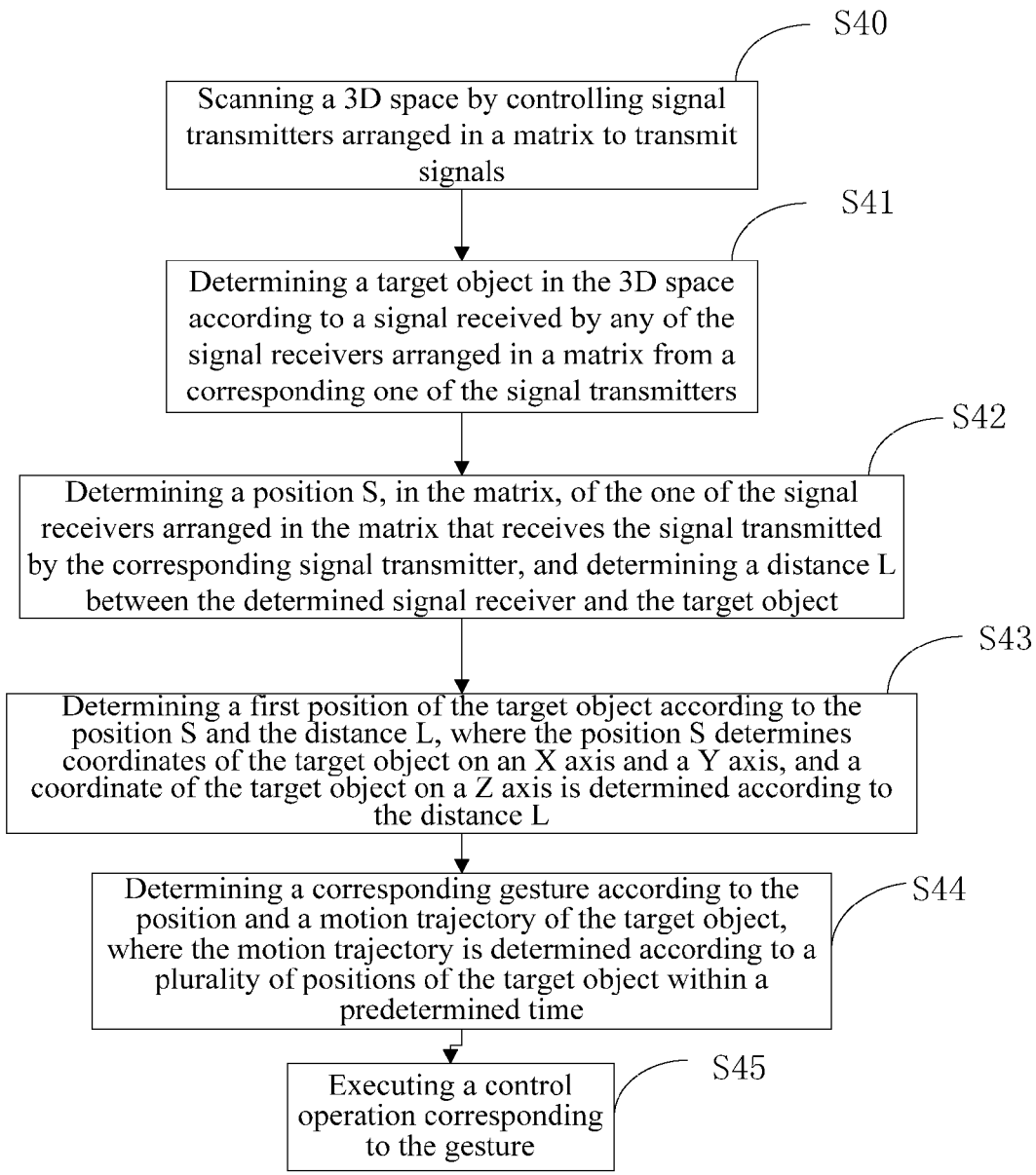
Figures 2, 4:
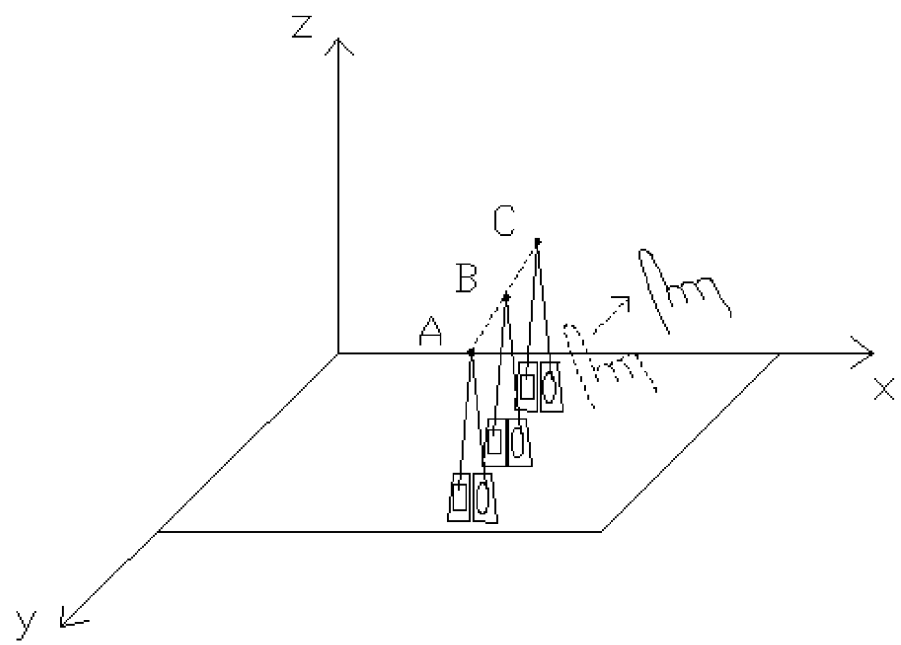
Figures 3, 4:
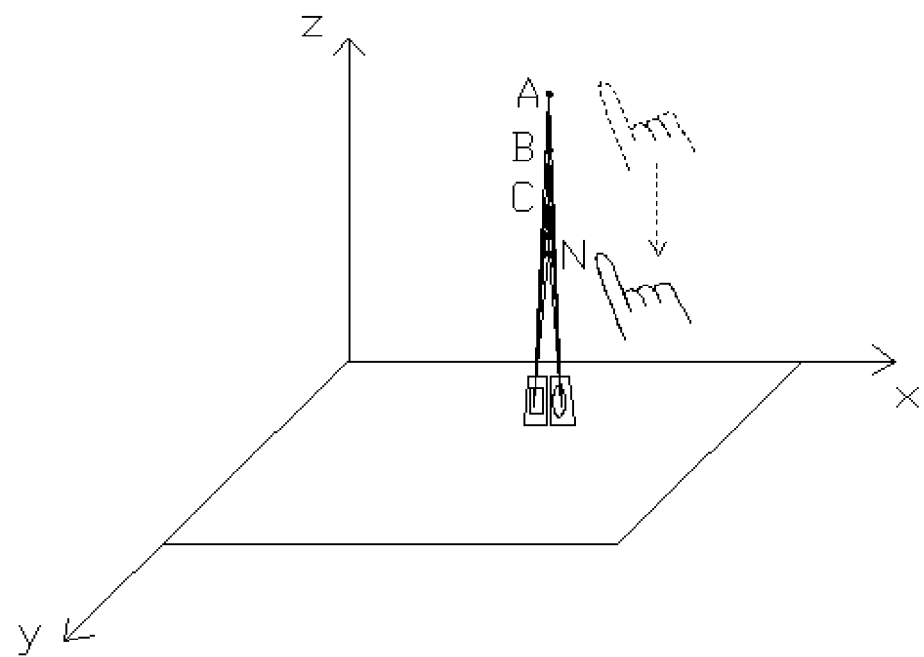

Referring to FIG. 4-1, there is shown a schematic flowchart diagram of an interactive displaying method for achieving displaying of a holographic image according to a fourth embodiment of the present disclosure. The process flow of the interactive displaying method shown in this embodiment comprises the following steps of:

S40, scanning a 3D space by controlling signal transmitters arranged in a matrix to transmit signals.

S41, determining a target object in the 3D space according to a signal received by any of the signal receivers arranged in a matrix from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object.

S42, determining a position S, in the matrix, of the one of the signal receivers arranged in the matrix that receives the signal transmitted by the corresponding signal transmitter, and determining a distance L between the determined signal receiver and the target object.

S43, determining a first position of the target object according to the position S and the distance L. Coordinates of the target object on an X axis and a Y axis are determined by the position S, and a coordinate of the target object on a Z axis is determined according to the distance L.

S44, determining a corresponding gesture according to the position and a motion trajectory of the target object, where the motion trajectory is determined according to a plurality of positions of the target object within a predetermined time.

The viewable image corresponding to the target object is displayed at a second position of a display region, and the second position has a mapping relationship with the first position.

S45, executing a control operation corresponding to the gesture.

As shown in FIG. 4-2, the finger performs a depressing gesture in the 3D space and moves towards the display region along the Y axis, and the motion trajectory thereof is a straight line parallel to the Y axis. During the moving process of the finger, a signal can be reflected at each position of the finger in the 3D space and the reflected signal can then be received by the corresponding signal receiver. Therefore, coordinates of a plurality of positions (e.g., points A $(x, y_a, z)$, B $(x, y_b, z)$ and C $(x, y_c, z)$ as shown in FIG. 4-1) of the finger during the moving process thereof within the predetermined time can be detected, and the moving trajectory of the hand can be determined according to the points A, B and C. The determined moving trajectory is a straight line parallel to the Y axis, so it is determined that the finger is performing a depressing gesture and thus the control operation corresponding to the depressing is executed.

Referring to FIG. 4-3, the finger is performing a pulling-down gesture, and the finger moves downwards along the Z axis within a predetermined time. All signals are received by a same signal receiver within the predetermined time, and coordinates of n positions of the finger are respectively points A $(x, y, z_1)$, B $(x, y, z_2)$, C $(x, y, z_3)$, . . . , and N $(x, y, z_n)$. Therefore, it can be determined that the motion trajectory of the finger is a straight line parallel to the Z axis, and that the gesture of the finger is the pulling-down gesture. Then, the control operation corresponding to the pulling-down gesture is executed in the display region.

Figures 1, 5:
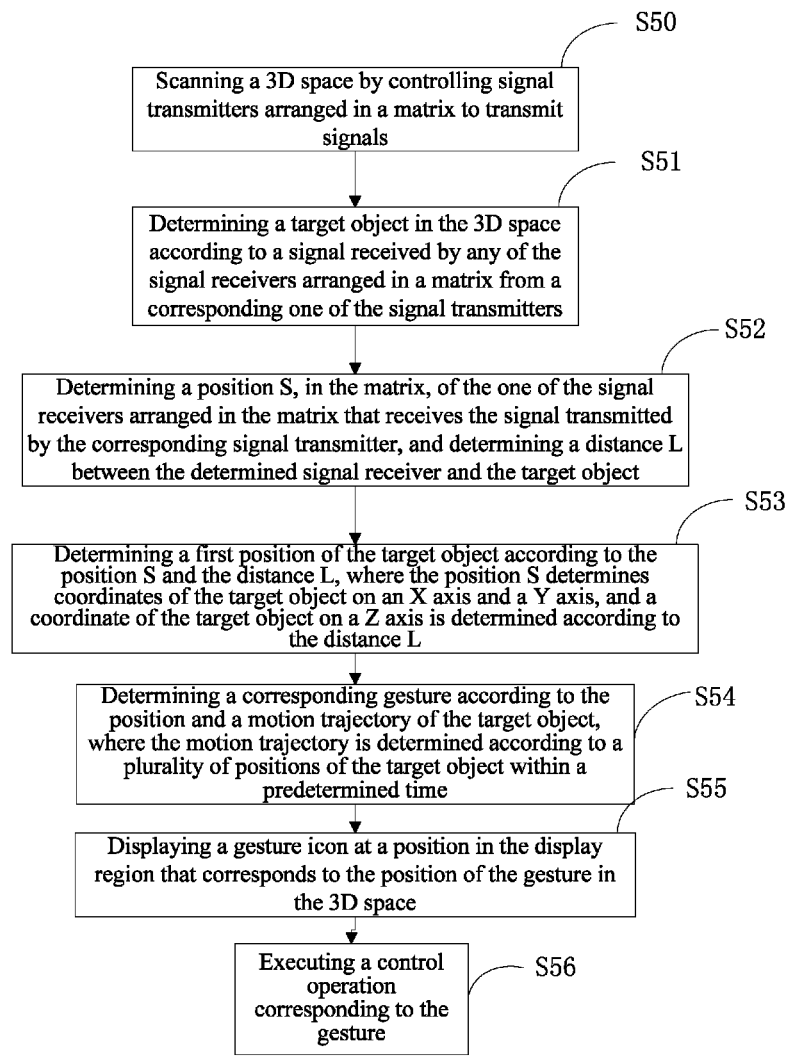
Figures 2, 5:
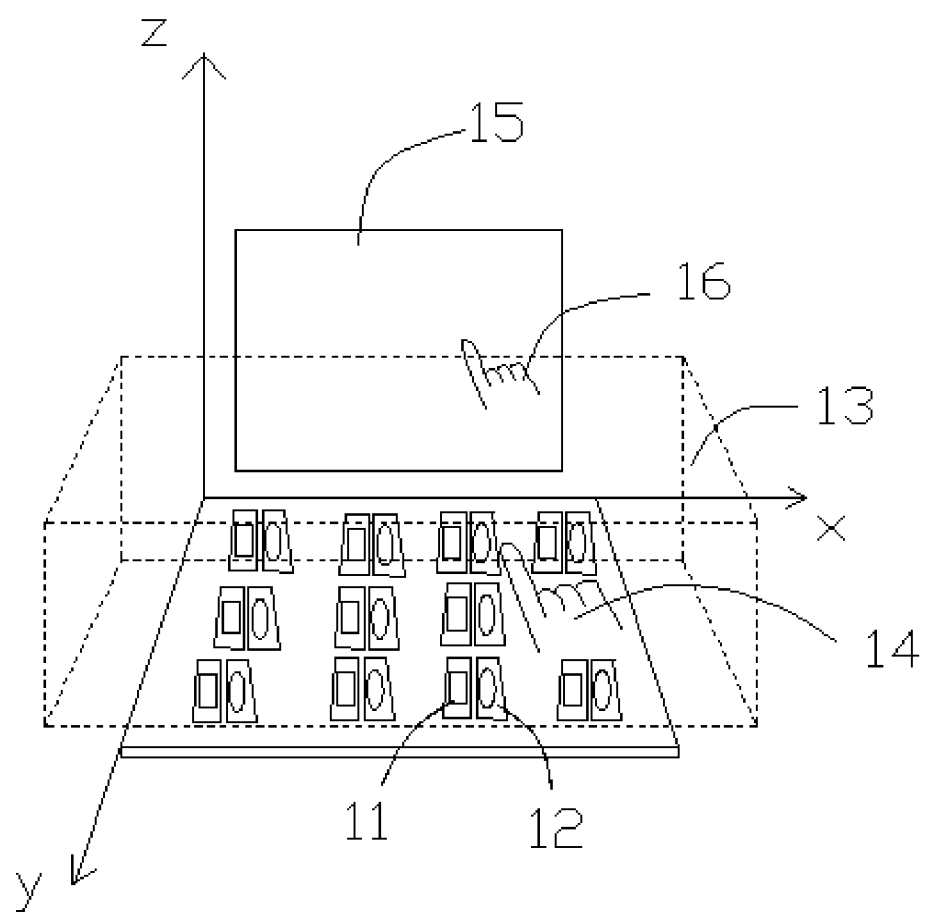
Figures 3, 5:
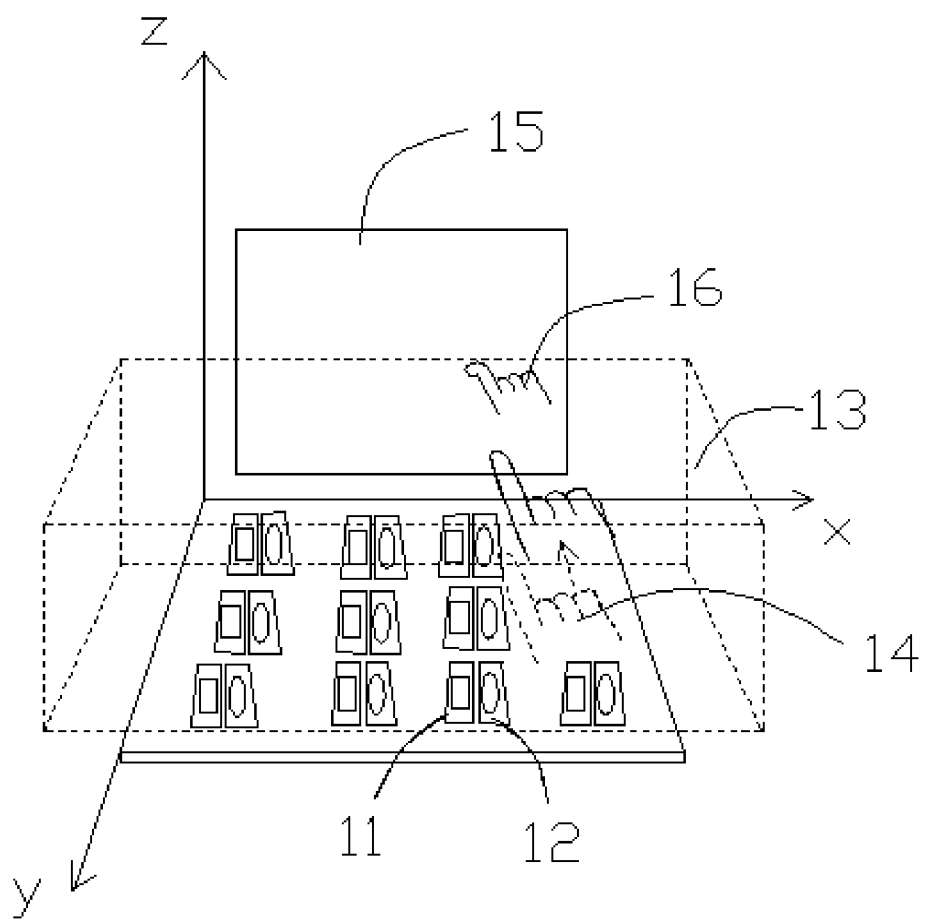

Referring to FIG. 5-1, there is shown a schematic flow-chart diagram of an interactive displaying method for achieving displaying of a holographic image according to a fifth embodiment of the present disclosure. The process flow of the interactive displaying method shown in this embodiment comprises the following steps of:

S50, scanning a 3D space by controlling signal transmitters arranged in a matrix to transmit signals.

S51, determining a target object in the 3D space according to a signal received by any of the signal receivers arranged in a matrix from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object.

S52, determining a position S, in the matrix, of the one of the signal receivers arranged in the matrix that receives the signal transmitted by the corresponding signal transmitter, and determining a distance L between the determined signal receiver and the target object.

S53, determining a first position of the target object according to the position S and the distance L. The position S determines coordinates of the target object on an X axis and a Y axis, and a coordinate of the target object on a Z axis is determined according to the distance L.

S54, determining a corresponding gesture according to the position and a motion trajectory of the target object, where the motion trajectory is determined according to a plurality of positions of the target object within a predetermined time.

S55, displaying a gesture icon at a position in the display region that corresponds to the position of the gesture in the 3D space.

S56, executing a control operation corresponding to the gesture.

In this embodiment, after the gesture of the finger is determined through the method similar to that of the fourth embodiment, a gesture icon will be displayed at a position corresponding to the finger in the display region. The finger in the viewable image 16 (e.g., the viewable image 16 of the finger 14 shown in FIG. 5-2) is straight before depressing; and when the action of the finger 14 is a depressing gesture, the icon of the finger of the viewable image 16 in the display region 15 also performs a depressing action correspondingly (e.g., the finger in the viewable image 16 shown in FIG. 5-3 is bent). The gesture icon may be displayed in a plurality of manners, for example, displaying manners commonly used in the art such as changing the image status as in this embodiment, changing the color, changing the position or the like.

Figures 1, 6:
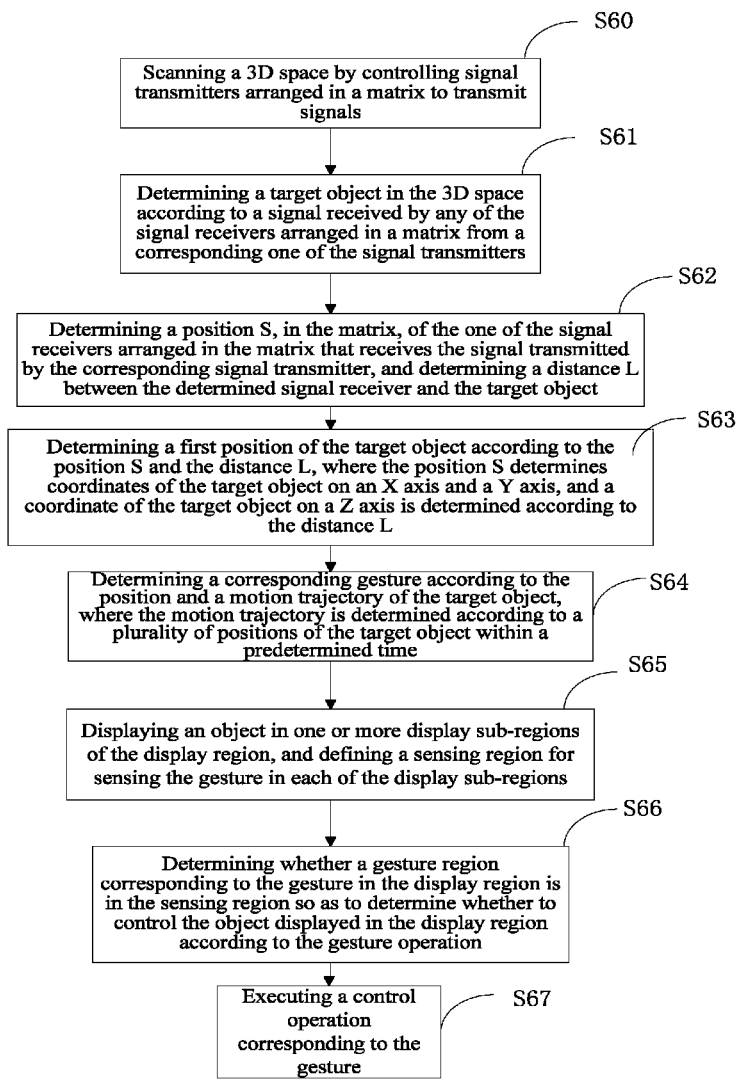
Figures 2, 6:
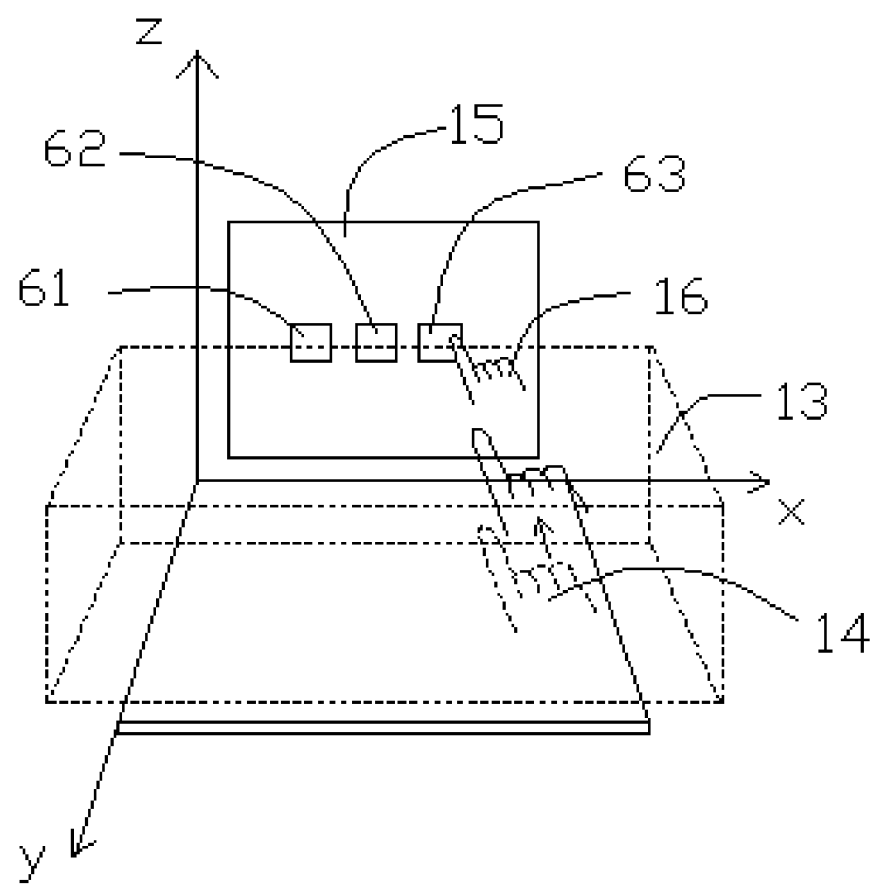
Figures 3, 6:
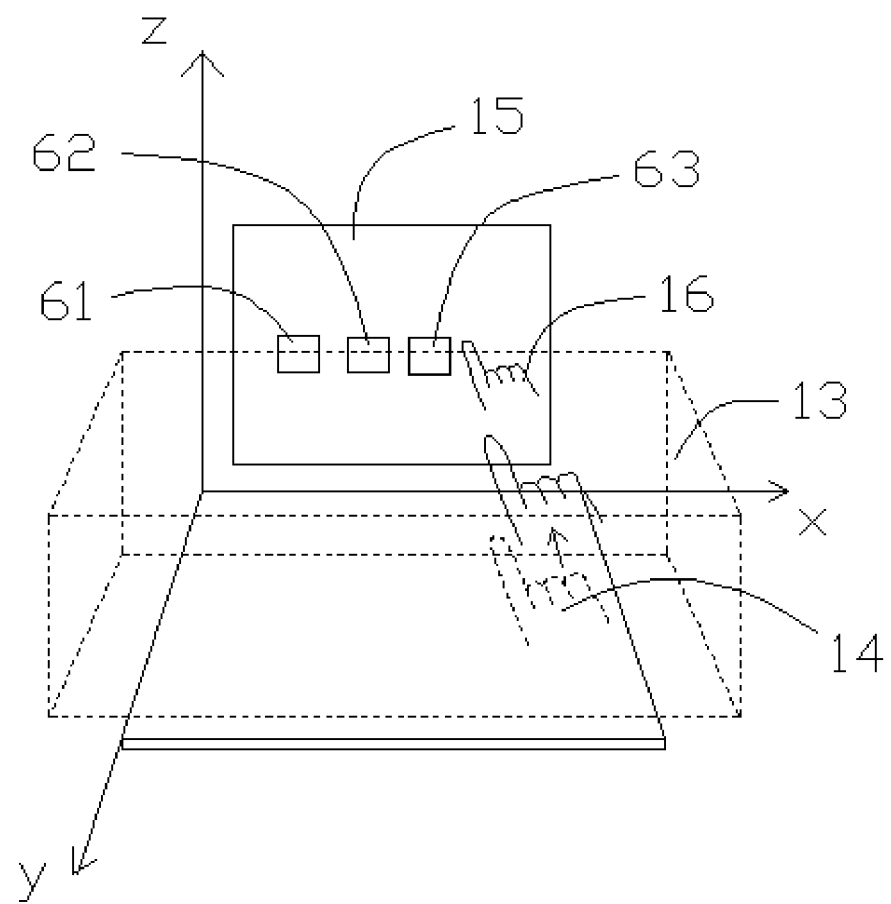

Referring to FIG. 6-1, there is shown a schematic flow-chart diagram of an interactive displaying method for achieving displaying of a holographic image according to a sixth embodiment of the present disclosure. The process flow of the interactive displaying method shown in this embodiment comprises the following steps of:

S60, scanning a 3D space by controlling signal transmitters arranged in a matrix to transmit signals.

S61, determining a target object in the 3D space according to a signal received by any of the signal receivers arranged in a matrix from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object.

S62, determining a position S, in the matrix, of the one of the signal receivers arranged in the matrix that receives the signal transmitted by the corresponding signal transmitter, and determining a distance L between the determined signal receiver and the target object.

S63, determining a first position of the target object according to the position S and the distance L. Coordinates of the target object on an X axis and a Y axis are determined by the position S, and a coordinate of the target object on a Z axis is determined according to the distance L.

S64, determining a corresponding gesture according to the position and a motion trajectory of the target object, where the motion trajectory is determined according to a plurality of positions of the target object within a predetermined time.

S65, displaying an object in one or more display sub-regions of the display region, and defining a sensing region for sensing the gesture in each of the display sub-regions.

S66, determining whether a gesture region corresponding to the gesture in the display region is in the sensing region so as to determine whether to control the object displayed in the display region according to the gesture operation.

S67, executing a control operation corresponding to the gesture.

Referring to FIG. 6-2, in this embodiment, the trajectory of the finger 14 is a depressing gesture. After the gesture is determined, an object is displayed in one or more display sub-regions of the display region 15. A button 61, a button 62, and a button 63 in the display region are defined as the sensing region of the gesture. When the viewable image 16 corresponding to the finger 14 in the display region 15 falls in the sensing region during the depressing action, as shown in FIG. 6-2, the viewable image 16 corresponding to the finger 14 in the display region 15 falls in the region of the button 63. After the depressing gesture is completed, an object will be displayed in the display region through a control operation according to the depressing gesture. If the viewable image 16 corresponding to the finger 14 in the display region 15 is not on any one of the buttons 61, 62, and 63 but is in some other non-sensing region (as shown in FIG. 6-3), then an object will not be displayed in the display region through a control operation according to the depressing gesture.

In the interactive displaying method of the present disclosure, the signals transmitted by the signal transmitters are laser signals, infrared signals or ultrasonic signals or signals transmitted by other signal transmitters commonly used in the art.

Figure 7:
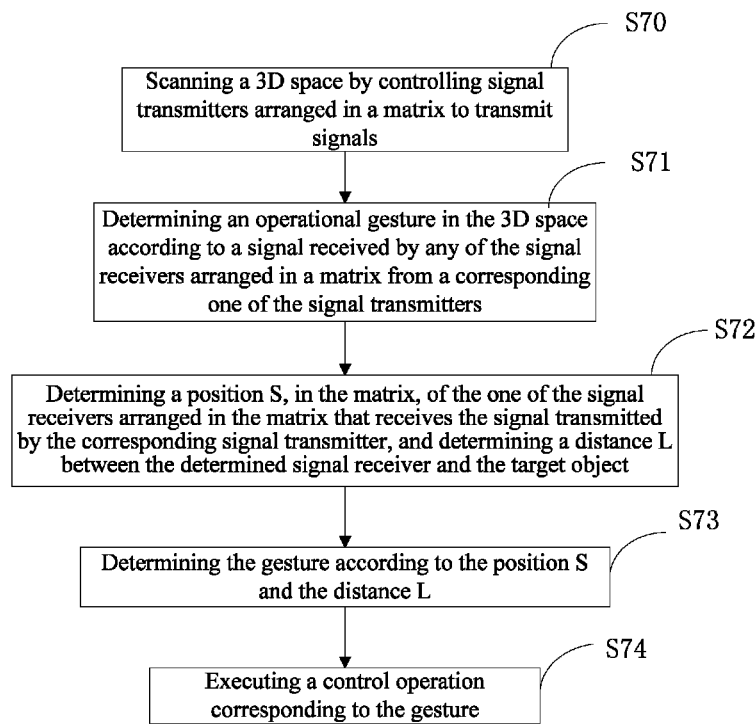
FIG. 7 is a schematic flowchart diagram of an interactive control method for achieving displaying of a holographic image according to an embodiment of the present disclosure.

Referring to FIG. 7, there is shown a schematic flowchart diagram of an interactive control method for achieving displaying of a holographic image according to an embodiment of the present disclosure. The process flow of the interactive control method shown in this embodiment comprises the following steps of:

S70, scanning a 3D space by controlling signal transmitters arranged in a matrix to transmit signals.

S71, determining an operational gesture in the 3D space according to a signal received by any of the signal receivers arranged in a matrix from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the hand.

Referring back to FIG. 5-2, the signal transmitters arranged in a matrix are controlled to transmit signals to scan the 3D space. When the finger moves along the Y axis in the 3D space, signals reflected by the finger at a plurality of positions in the 3D space are received by the signal receivers. Thereby, a motion trajectory of the finger is determined and the gesture of the finger is determined.

S72, determining a position S, in the matrix, of the one of the signal receivers arranged in the matrix that receives the signal transmitted by the corresponding signal transmitter, and determining a distance L between the determined signal receiver and the hand.

S73, determining the gesture according to the position S and the distance L.

The gesture is obtained by moving the finger, and the motion trajectory of the finger must be determined first before the gesture is determined. Moving of the finger is represented by changes in position of the points in the space. Referring back to FIG. 3-2, each point in the motion trajectory of the finger within a predetermined time is determined as follows:

After a signal transmitted by the signal transmitter A is reflected by the point A, it is detected that the signal is received by the corresponding signal receiver A. The position S (x, y), in the matrix, of the signal receiver A that receives the reflected signal is just the position of the finger in the plane defined by the X axis and the Y axis. Because the signal receiver A is disposed corresponding to the signal transmitter A and at a position in the matrix that is identical or adjacent to that of the signal transmitter A, it can be believed that the distance L between the signal receiver A and the finger is approximately equal to the distance (i.e., the coordinate z of the point A on the Z axis) from the point A to the plane defined by the X axis and the Y axis. Therefore, the first position A (x, y, z) of the point A can be determined.

After the position of each point is determined, the motion trajectory of the finger can be determined in a way that is specifically shown as follows:

Referring back to FIG. 4-3, the finger is performing a pulling-down gesture, and the finger moves downwards along the Z axis within a predetermined time. Coordinates of n positions of the finger received by the signal receiver within the predetermined time are respectively points A (x, y, $z_1$), B (x, y, $z_2$), C (x, y, $z_3$), . . . , and N (x, y, $z_n$). Therefore, it can be determined that the motion trajectory of the finger is a straight line parallel to the Z axis, and that the gesture of the finger is the pulling-down gesture.

S74, executing a control operation corresponding to the gesture. After it is determined that the gesture is the pulling-down gesture, a control operation corresponding to the pulling-down gesture is executed.

Figure 8:
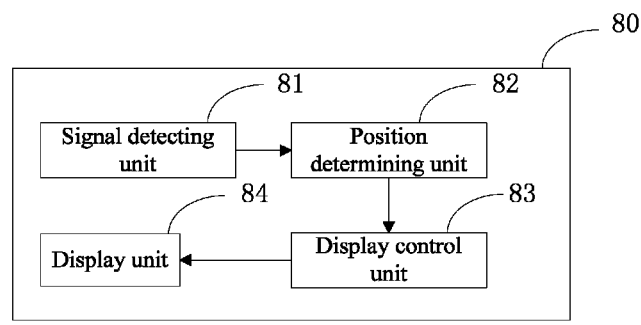
FIG. 8 is a schematic structural view of an interactive displaying apparatus for achieving displaying of a holographic image according to an embodiment of the present disclosure.

Referring to FIG. 8, there is shown a schematic structural view of an interactive displaying apparatus for achieving displaying of a holographic image according to an embodiment of the present disclosure. The interactive displaying apparatus comprises a display unit 84, a signal detecting unit 81, a position determining unit 82 and a display control unit 83.

The signal detecting unit 81 is formed by a plurality of pairs of signal transmitters and signal receivers arranged in matrices, and is configured to scan a 3D space by controlling the signal transmitters to transmit signals and to determine a target object in the 3D space according to a signal received by any of the signal receivers from a corresponding one of the signal transmitters.

Each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object.

The position determining unit 81 is configured to determine a position S, in the matrix, of the one of the signal receivers arranged in the matrix that receives the signal transmitted by the corresponding signal transmitter, and determine a distance L between the determined signal receiver and the target object; and is further configured to determine a first position of the target object according to the position S and the distance L.

The display control unit 83 is configured to control the display unit to display a viewable image corresponding to the target object at a second position of a display region according to the first position of the target object determined by the position determining unit, where the second position has a mapping relationship with the first position.

The signal detecting unit 81 controls the signal transmitters to scan the 3D space. After the finger enters the 3D space, a signal transmitted by one of the signal transmitters is reflected by the finger when encountering the finger and is then received by the corresponding signal receiver. A signal of the signal transmitter A is reflected by a point (e.g., the point A) on the finger and the reflected signal is then received by the corresponding signal receiver A, so the signal detecting unit determines that the finger is detected.

The position determining unit 82 determines a position S, in the matrix, of the signal receiver A that receives the reflected signal in the matrix and a distance L between the signal receiver and the point A, and then determines a first position of the point A according to the position S and the distance L. Positions of a plurality of other points on the finger can be determined in the same way so that the position of the finger can be determined.

After the first position of the finger is determined by the position determining unit 82, the display control unit 83 controls the display unit 84 to display the viewable image corresponding to the finger at a second position in the display region, and the second position has a mapping relationship with the first position. Specifically, the display control unit 83 may be a holographic projection device, and is able to project a holographic image corresponding to the finger onto the second position in the display region of the display unit 84 so that the holographic image corresponding to the finger can be displayed.

In the interactive displaying apparatus of the present disclosure, the signals transmitted by the signal transmitters are laser signals, infrared signals or ultrasonic signals or signals transmitted by other signal transmitters commonly used in the art.

Furthermore, it is apparent to those skilled in the art, the present disclosure also provides an interactive display apparatus for achieving displaying of a holographic image, which comprises a display unit (as indicated by a label 84 shown in FIG. 8), a non-transitory program storage medium and a processor. The non-transitory program storage medium stores a program executed by the processor to perform the methods as described in above. In addition, other units as shown in FIG. 8 (such as the signal detecting unit 81, the position determining unit 82 and the display control unit 83) may be software modules, and the software modules inherently are stored in the non-transitory program storage medium and executed by the processor.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. An interactive displaying method for achieving displaying of a holographic image, comprising the following steps of:
    scanning a three-dimensional (3D) space by controlling signal transmitters arranged in a matrix to transmit signals;
    determining a target object in the 3D space according to a signal received by any of signal receivers arranged in a matrix from a corresponding one of the signal transmitters, wherein each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object;
    determining a position S, in the matrix, of the one of the signal receivers arranged in the matrix that receives the signal transmitted by the corresponding signal transmitter, and determining a distance L between the determined signal receiver and the target object;
    determining a first position of the target object according to the position S and the distance L; and
    displaying a viewable image corresponding to the target object at a second position of a display region, wherein the second position has a mapping relationship with the first position;
    wherein the step of determining a target object in the 3D space according to a signal received by any of the signal receivers arranged in a matrix from a corresponding one of the signal transmitters comprises:
    detecting whether any of the signal receivers arranged in the matrix receives a signal;
    if there is any of the signal receivers that has received a signal, then determining whether label information carried in the received signal matches label information of the signal receiver, wherein the label information carried by the signal is carried when the signal is transmitted by the signal transmitter, and the label information matches the label information of the signal receiver corresponding to the signal transmitter; and
    if the label information carried by the received signal matches the label information of the signal receiver, then determining that the target object is located in the 3D space.

2. The interactive displaying method for achieving displaying of a holographic image of claim 1, wherein the signals transmitted by the signal transmitters are laser signals, infrared signals or ultrasonic signals.

3. The interactive displaying method for achieving displaying of a holographic image of claim 1, wherein the step of determining a first position of the target object according to the position S and the distance L is specifically as follows: determining coordinates of the target object on an X axis and a Y axis according to the position S, and determining a coordinate of the target object on a Z axis according to the distance L.

4. The interactive displaying method for achieving displaying of a holographic image of claim 1, further comprising the following steps after the step of determining a first position of the target object according to the position S and the distance L:
    determining a corresponding gesture according to the position and a motion trajectory of the target object, wherein the motion trajectory is determined according to a plurality of positions of the target object within a predetermined time; and
    executing a control operation corresponding to the gesture.

5. The interactive displaying method for achieving displaying of a holographic image of claim 4, further comprising the following step after the step of determining a corresponding gesture according to the position and a motion trajectory of the target object:
    displaying a gesture icon at a position in the display region that corresponds to the position of the gesture in the 3D space.

6. The interactive displaying method for achieving displaying of a holographic image of claim 4, further comprising the following steps after the step of determining a corresponding gesture according to the position and a motion trajectory of the target object:

displaying an object in one or more display sub-regions of the display region, and defining a sensing region for sensing the gesture in each of the display sub-regions; and determining whether a gesture region corresponding to the gesture in the display region is in the sensing region so as to determine whether to control the object displayed in the display region according to the gesture operation.

7. The interactive displaying method for achieving displaying of a holographic image of claim 1, wherein the step of displaying a viewable image corresponding to the target object at a second position of a display region is specifically as follows: displaying a holographic image corresponding to the target object at the second position of the display region.

8. An interactive displaying apparatus for achieving displaying of a holographic image, comprising a display unit, wherein the apparatus comprises:

a signal detecting unit, being formed by a plurality of pairs of signal transmitters and signal receivers arranged in matrices, being configured to scan a 3D space by controlling the signal transmitters to transmit signals and to determine a target object in the 3D space according to a signal received by any of the signal receivers from a corresponding one of the signal transmitters, wherein each of the signal receivers is disposed corresponding to one of the signal transmitters and at a position in the matrix that is identical or adjacent to that of the corresponding one of the signal transmitters, and each of the signal receivers is only able to receive a reflected signal formed by the signal transmitted by the corresponding signal transmitter when being reflected by the target object;

a position determining unit, being configured to determine a position S, in the matrix, of the one of the signal receivers arranged in the matrix that receives the signal transmitted by the corresponding signal transmitter, and determine a distance L between the determined signal receiver and the target object; and is further configured to determine a first position of the target object according to the position S and the distance L; and a display control unit, being configured to control the display unit to display a viewable image corresponding to the target object at a second position of a display region according to the first position of the target object determined by the position determining unit, wherein the second position has a mapping relationship with the first position;

wherein the signal detecting unit is further configured to detecting whether any of the signal receivers arranged in the matrix receives a signal; if there is any of the signal receivers that has received a signal, then determine whether label information carried in the received signal matches label information of the signal receiver, wherein the label information carried by the signal is carried when the signal is transmitted by the signal transmitter, and the label information matches the label information of the signal receiver corresponding to the signal transmitter; and if the label information carried by the received signal matches the label information of the signal receiver, then determine that the target object is located in the 3D space.

* * * * *